B. WEINBERGER.
TRANSMISSION MECHANISM FOR SEWING MACHINES.
APPLICATION FILED MAR. 13, 1919.
1,360,337.
Patented Nov. 30, 1920.
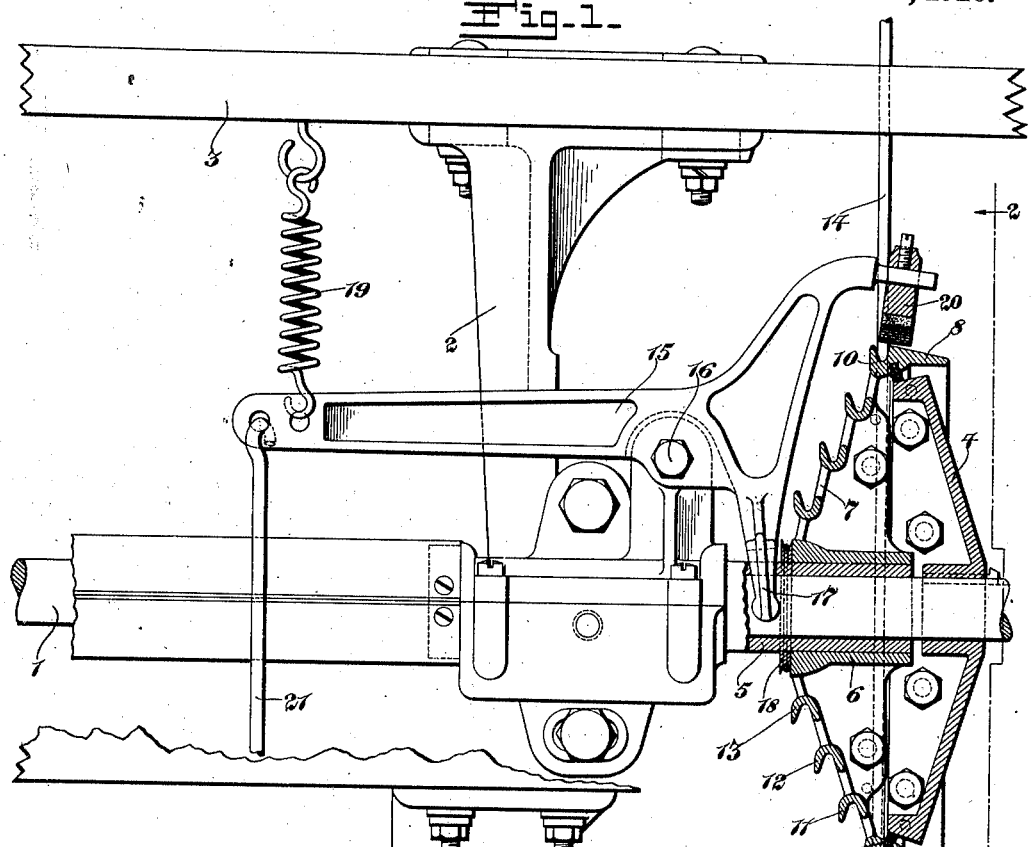
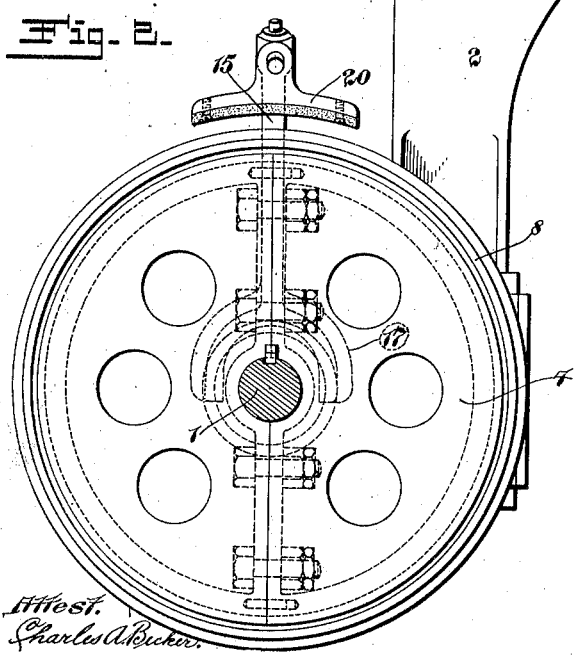

UNITED STATES PATENT OFFICE.

BENJAMIN WEINBERGER, OF ST. LOUIS, MISSOURI, ASSIGNOR TO MARX & HAAS CLOTHING CO., OF ST. LOUIS, MISSOURI, A CORPORATION.

TRANSMISSION MECHANISM FOR SEWING-MACHINES.

1,360,337.  Specification of Letters Patent.  Patented Nov. 30, 1920.

Application filed March 13, 1919. Serial No. 282,404.

*To all whom it may concern:*

Be it known that I, BENJAMIN WEINBERGER, a citizen of the United States, residing at the city of St. Louis and State of Missouri, have invented a new and useful Transmission Mechanism for Sewing-Machines, of which the following is a specification.

This invention relates to transmission mechanism for sewing macines.

An object of the invention is to provide a more efficient and simple transmission mechanism for use in driving a sewing machine from a rotary shaft.

Another object of the invention is to provide a mechanism of the character described of which a number thereof may be mounted upon a single rotary shaft and efficiently controlled to operate a corresponding number of sewing machines mounted on the support in connection with which the shaft is arranged.

Another object of the invention is to provide a novel and efficient mechanism of the character described equipped with means for driving the sewing machine at varying speeds.

Other objects will appear from the following description in which reference is made to the drawing illustrating a preferred embodiment of the invention, and in which—

Figure 1 is a view of the invention partly in section.

Fig. 2 is a view looking toward the transmission mechanism from the line 2—2 of Fig. 1.

Fig. 3 is a sectional view illustrating a modified form of one part of the invention.

The shaft 1 is revolubly journaled in bearings supported by hangers 2 secured to the under side of a bench or table 3 arranged to support the sewing machines. The shaft 1 is driven by any appropriate power device (not shown) and supports the transmission mechanism.

A clutch member 4 is rigid with the shaft 1 and is in constant rotation when the shaft is rotating. At one side of the clutch member 4 the shaft supports a sleeve 5 upon which is loosely mounted the hub 6 of the coöperating clutch member. In the form shown in Fig. 1, the coöperating clutch member includes a dished disk 7 having a circumferential flange 8 which completely encircles the clutch member 4 and extends beyond the outer side of the periphery thereof a sufficient distance to prevent threads, pieces of cloth and other substances and material from becoming caught or entangled with the clutch member 4. This loose clutch member is formed with an internal groove in which is secured a quantity of appropriate frictional material 9, such, for instance, as indurated fiber or the like. When the loose clutch member is moved toward the clutch member 4 the friction surface, by engagement with the inclined periphery of the clutch member 4, causes the loose clutch member to be revolved along with the clutch member 4. However, when the pressure is released from against the loose clutch member it will move away from the clutch member 4 and will be promptly stopped from further rotation by a brake device hereinafter described.

As shown in Fig. 1, the loose clutch member is formed with a number of belt receiving pulleys of different diameters so that the belt, driven from the loose clutch member, may be driven at different selected speeds. In the particular construction shown the periphery of the loose clutch member is formed with a belt receiving pulley 10 which will drive the belt at a high rate of speed equal to the speed of rotation of the periphery of the loose clutch member. The dished disk 7 is formed with another belt receiving pulley 11 which is of smaller diameter than the pulley 10 and will therefore drive the belt at slower speed than will the pulley 10. Said disk 7 supports also a pulley 12 which is of smaller diameter than the pulley 11, and a pulley 13 which is of smaller diameter than the pulley 12. The belt 14 may be connected with either of the pulleys shown and can therefore be driven at varying selected speeds from the same transmission member rotating at an unvarying speed.

A lever 15 is pivoted upon a support 16 and has a fork 17 the arms of which extend on opposite sides of the sleeve 5 adjacent to a washer 18 which is loose on the sleeve 5 at the end of the hub 6 of the clutch member. A spring 19 has one end connected to the lever 15 and the opposite end to the bench or table 3, and is effective to actuate the lever to draw the fork 17 away from the loose clutch member and leave the latter disengaged from the revolving clutch member 4. A brake shoe 20 is carried by an arm of the lever 15 and when said lever is under control of the spring 19 the brake shoe is retained in contact with the surface of the flange 8 on the loose clutch member while the latter is away from the clutch member 4 and preventing any rotation of the loose clutch member. The lever 15 may be operated by an appropriate connection 21 to press the loose clutch member into clutching engagement with the clutch member 4, at the same time releasing the brake from the loose clutch member and leaving the latter in rotation with the clutch member 4.

The construction of the frictional clutch surfaces of the clutch members provides for the return of the clutch member 7 to "off" position when pressure against the member 7 by the clutch setting lever 15 is released. The inclined clutching surface on the periphery of the clutch member 4 tends to repel the clutch member 7 to "off" position and this tendency is assisted by the brake 20 coöperating with the inclined peripheral surface of the flange 8. As a consequence of this when pressure of the clutch lever against the clutch member 7 is stopped the inclined peripheral frictional clutch surface of the clutch member 4 coöperates with the brake 20 acting on the inclined surface of the flange 8 to disengage the clutch member 7 from the clutch member 4, permitting the brake 20 to stop the clutch member 7.

As shown in Fig. 1, the various pulleys are made integral with the dished disk 7. However, if desired, the smaller pulleys may be formed separately and attached to the disk of the largest pulley. Such construction is shown in Fig. 3 in which the disk 22 of largest pulley releasably supports a smaller pulley 23 secured thereto by screws 24. Also a smaller pulley 25 may be releasably secured to the pulley 23 by screws 26; and an additional pulley 27 may be secured to the pulley 25 by releasable screws 28. It is obvious that this construction may be varied if desired.

From the foregoing it will be understood that I have provided a very simple and efficient transmission mechanism which completely serves its purpose. The particular construction and arrangement of the parts may be varied without departure from the principle of the invention, and I do not restrict myself to unessential features or details thereof.

What I claim is:—

1. Transmission mechanism, comprising a rotating shaft, a clutch member attached to said shaft and having a frictional clutch surface which is inclined relative to the axis of said member, a stationary support, a clutch member revoluble on said stationary support and having a portion for engagement with the inclined frictional clutch surface on the first-named clutch member, a device for moving said second clutch member into clutching engagement with the inclined frictional clutch surface of the clutch member which is on the shaft, a circumferential flange on the second clutch member of greater width than the periphery of the first clutch member inclosing the entire periphery of the first clutch member in any position of the second one, and a driven element operated by the second clutch member.

2. Transmission mechanism, comprising a journal bearing, a shaft journaled for rotation in said bearing, a clutch member attached to said shaft, an inclined frictional clutch surface on the periphery of said shaft, a clutch member supported by said journal bearings independently of said shaft, an annular flange on the second clutch member arranged to inclose the periphery of the first clutch member in any position of the second one, a part on said second clutch member for engaging the inclined clutch surface on the first clutch member, a lever for moving the second clutch member as required to engage said part with the inclined clutch surface on the first clutch member, a device operated by said lever for coöperating with said flange to move the second clutch member out of engagement with the first one, and a driven element operated by the second clutch member.

3. Transmission mechanism, comprising a journal bearing, a rotating shaft journaled in said bearing, a clutch member fixed on the shaft, a clutch member slidably and revolubly supported on said journal bearing independently of said shaft, inclined clutch surfaces on said clutch members arranged so that the first clutch member will actuate the second clutch member out of clutching engagement, a lever operable to move the second-named clutch member into clutching engagement with the other one, and means carried by said lever for coöperating with the second-named clutch member to disengage it from the other one.

4. Power transmission mechanism, comprising a journal bearing, a clutch member journaled for rotation on said bearing, a rotating shaft journaled in said bearing, a clutch member fixed on said shaft, inclined clutch surfaces on said clutch members arranged so that the first clutch member will actuate the second clutch member out of clutching engagement, a lever operable to move the first-named clutch member into clutching engagement with the clutch member which is fixed on the shaft, and a brake actuated by said lever to stop rotation of the clutch member which is on the bearing while the clutch member which is on the shaft continues to rotate.

5. Power transmission mechanism, comprising a journal bearing, a clutch member journaled for rotation on said bearing, a rotating shaft journaled in said bearing, a clutch member fixed on said shaft, inclined clutch surfaces on said clutch members arranged so that the first clutch member will actuate the second clutch member out of clutching engagement, a lever operable to move the first-named clutch member into clutching engagement with the clutch member which is fixed on the shaft, a brake actuated by said lever to stop rotation of the clutch member which is on the bearing while the clutch member which is on the shaft continues to rotate, an element arranged to be driven by the first-named clutch member, and means for driving said element at selected rates of speed by the rotation of said clutch member at a single rate of speed.

6. Power transmission mechanism, comprising a journal bearing, a clutch member mounted for rotation on said bearing, a shaft journaled for rotation in said bearing, a clutch member fixed on said shaft, a lever operable to move the clutch member which is on the bearing into clutching engagement with the clutch which is fixed on the shaft, a device for moving said lever to position to permit the clutch member on the bearing to move out of engagement with the other clutch member, and a device operated by said lever arranged to coöperate with said first-named clutch member to move the said first-named clutch member out of clutching engagement with the other clutch member.

7. Transmission mechanism, comprising a rotary shaft, a clutch member fixed on the shaft and having an inclined peripheral clutch surface, a second clutch member movable into clutching engagement with the inclined clutch surface of the first clutch member in opposition to the tendency of the first clutch member to repel the second one, a peripheral surface on the second clutch member inclined in a direction opposite from the direction of inclination of the clutch surface on the first clutch member, a lever for moving the second clutch member into engagement with the first one, a brake device carried by said lever for coöperating with the inclined surface on the second clutch member to move said second clutch member out of engagement with the first one and to stop rotation of said second clutch member, and means for actuating said lever to engage said brake device with said inclined surface.

BENJAMIN WEINBERGER.